(12) United States Patent
Schaffer et al.

(10) Patent No.: US 7,085,747 B2
(45) Date of Patent: Aug. 1, 2006

(54) REAL-TIME EVENT RECOMMENDER FOR MEDIA PROGRAMMING USING "FUZZY-NOW" AND "PERSONAL SCHEDULER"

(75) Inventors: J. David Schaffer, Wappingers Falls, NY (US); Karen I. Trovato, Putnam Valley, NY (US); Kaushal Kurapati, Yorktown Heights, NY (US)

(73) Assignee: J Koninklijke Philips Electronics, NV., Eindhoven (NL)

( * ) Notice: Subject to any disclaimer, the term of this patent is extended or adjusted under 35 U.S.C. 154(b) by 879 days.

(21) Appl. No.: 09/963,245

(22) Filed: Sep. 26, 2001

(65) Prior Publication Data
US 2003/0061183 A1    Mar. 27, 2003

(51) Int. Cl.
*G06F 15/18* (2006.01)

(52) U.S. Cl. .............................. 706/12; 706/14; 706/46
(58) Field of Classification Search .................. 706/12, 706/14, 46
See application file for complete search history.

(56) References Cited

U.S. PATENT DOCUMENTS

| | | | |
|---|---|---|---|
| 5,758,257 A * | 5/1998 | Herz et al. | 725/116 |
| 2001/0041995 A1 * | 11/2001 | Eder | 705/7 |
| 2002/0082901 A1 * | 6/2002 | Dunning et al. | 705/10 |
| 2003/0061202 A1 * | 3/2003 | Coleman | 707/3 |
| 2003/0067554 A1 * | 4/2003 | Klarfeld et al. | 348/461 |

FOREIGN PATENT DOCUMENTS

| | | |
|---|---|---|
| EP | 0 854 645 | 7/1998 |
| EP | 854645 * | 7/1998 |
| EP | 0 669 760 | 12/1999 |
| WO | WO97/46006 | 12/1997 |
| WO | WO 00/11869 | 3/2000 |

* cited by examiner

Primary Examiner—Joseph P. Hirl

(57) ABSTRACT

A recommendation system and method are disclosed. In the system and method, the personal schedule of the user is used to modify the recommendation functions of media events. The personal schedule may be entered by the user or determined through monitoring over time. An exemplary recommendation function modification is if a media event ends after the user's bedtime, as indicated by the personal schedule. In this example, the recommendation function of that event will be reduced in value because the user will likely go to bed before the event is over.

29 Claims, 14 Drawing Sheets

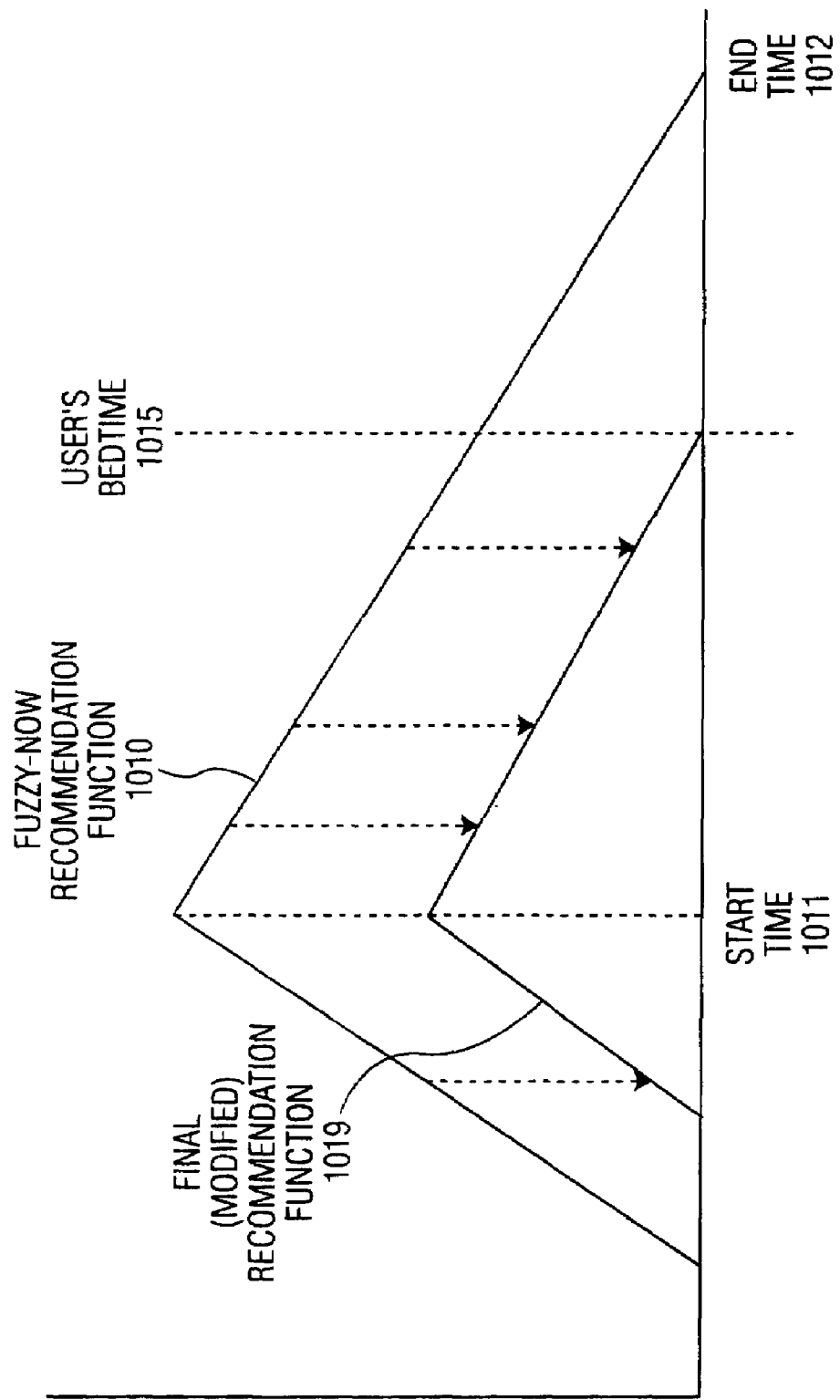

REAL-TIME EVENT RECOMMENDER FOR MEDIA PROGRAMMING USING "FUZZY-NOW" AND "PERSONAL SCHEDULER"

BACKGROUND OF THE INVENTION

1. Field of the Invention

This invention relates generally to media entertainment systems which use Electronic Program Guides (EPGs), and, more specifically, to a system and method of generating, for a particular time period, a suggested schedule of media presentations.

2. Description of the Related Art

An Electronic Program Guide (EPG) provides a visual display of media programming schedule information. Such media programming includes, but is not limited to, television shows (cable or broadcast), radio shows, and Webcasts (multicasts over the Internet). Typically, the media programming displayed is shown in real-time, i.e. the scheduling information shown is taking place currently or in the near future.

An exemplary EPG Graphical User Interface (GUI) is shown in FIG. 1. A timeline broken down into half-hour blocks is at reference numeral 101, and the programming for five different channels or stations is shown as horizontal strips at reference numerals 111–115. The user may use an input/ouput (I/O) device to select a particular block in order to see more information regarding the event (i.e., a discrete item of media presentation on a channel, such as a TV or radio show) indicated by that block. In FIG. 1, block 120 has been selected, as shown by its darker outline. Because it has been selected, descriptive information concerning the event in block 120 is shown at the top of the GUI at reference numeral 130. Preview display 130 may contain images and video as well as text to describe the event. The GUI in FIG. 1 only shows one segment of the programming schedule: specifically, the events on channels (or stations or websites) 2, 3, 4, 5, and 6 from time 8:00 to 9:30 p.m. In order to see other channels, the user may scroll up or down using the vertical scroll bar 140 and, in order to see different times, the user may scroll forward in time or backward in time using horizontal scroll bar 150.

The EPG GUI has been described independently of any particular medium or output device because the concept of an EPG GUI is likewise independent of any particular medium or display device. However, a block diagram of the relevant functional modules in a conventional media entertainment system that employs an EPG GUI will now be described with reference to FIG. 2. A media source 210 provides content through communication means 215. Examples of a media source include, but are not limited to, a cable TV (CATV) system, a broadcast television system, the Internet, or a storage/playback device (VCR, DVD player, CD-ROM player, a hard drive, a solid-state memory storage unit, etc.). Each media source may have many channels or just one channel.

Although communication means 215 is shown as a system bus in FIG. 2, it is merely for ease of presentation and does not represent the actual implementation of communication means 215. The system bus representation may describe one embodiment, where the different units are connected by a local area network (LAN). However, in other embodiments, there might be point-to-point connections between elements (with no shared broadcast medium) or a combination of separate networked and point-to-point connections. For example, a CATV system (Media Source 210) may have a point-to-point connection by coaxial cable with Receiver/Tuner 220 ("point-to-point" from the viewpoint of the individual Receiver/Tuner 220, not the viewpoint of the CATV system), whereas Receiver/Tuner 220, Controller 230, and output means 250 may all be connected by the interior wiring of a TV set. Examples of the one or more connections making up the communication means 215 include, but are not limited to, coaxial cable, terrestrial RF transmission, optical fiber, satellite microwave transmission, telephone network, local area network (LAN), etc. Media source 210 may comprise multiple media sources and the communication means 215 may comprise multiple communication means.

Receiver/Tuner 220 receives the media content by communication means 215 and transmits one or more channels to output means 250. Examples of a receiver/tuner 220 include, but are not limited to, a stereo AM/FM receiver, a television UHF/VHF broadcast receiver embedded in a television set, a set-top box (STB) attached to a CATV cable line, a receiver/tuner incorporated into a computer, a web browser, etc. A web browser is appropriate in this context because a web browser "tunes in" a particular URL (Uniform Resource Locator) to receive media content, such as streaming real-time video. Furthermore, a web browser may be implemented in a PC (Personal Computer), a PDA (Personal Digital Assistant), a mobile terminal (e.g. a WAP-enabled cellular telephone), or any device with a network connection and a processor. A channel may be a "web channel" or the output of a television station, a radio station, or a computer server. Examples of output content on a channel include, but are not limited to, shows, movies, real-time audio/video feed, news text, graphics, images, etc. Examples of output means 250 include, but are not limited to, a television set, a computer or television monitor, a stereo speaker system, a holographic display, a screen on a PDA or mobile device, etc.

A controller 230 controls receiver/tuner 220 to select channels to be output on output means 250 and may control other components in FIG. 2, depending on the particular system involved. Controller 230 may comprise one or more processors, may be integrated with receiver/tuner 220, and may be able to perform the steps of a program. Such a program may be stored in Storage 280 or embedded in the controller itself (e.g. the controller is an Application Specific Integrated Circuit (ASIC) chip). Storage 280 is in FIG. 2 for ease of description, and does not necessarily represent hardware. Because controller 230 may require different items stored, such as BIOS, programs, and data, Storage 280 in FIG. 2 symbolically represents the one or more locations where these items are stored. Storage 280 may be located remotely (e.g., near Media Source 210), locally (near output means 250), or broken up and distributed both locally and remotely. Storage 280 may be solid-state (SDRAM, flash memory, etc.), magnetic (hard drive, tape, etc.), or optic (CD-ROM, DVD, etc.) memory.

A Scheduling Information Source 260 provides scheduling information for the EPG that is generated for output means 250. In practice, the Scheduling Information Source 260 may be integral with the Media Source 210, e.g., scheduling data may be sent along with the channels in the form of an additional channel or as data multiplexed with individual channels. However, the Scheduling Information Source 260 may be a stand-alone server on the Internet or plugged into a CATV system. By contrast, the Scheduling Information Source 260 may also be multiple distributed information sources or downloaded locally from a portable storage means, such as a floppy disk. The scheduling information that is sent from the Scheduling Information Source 260 may be formatted for output on the output means 250, or may be unformatted, in which case the controller 230 would oversee the formatting of the scheduling information. Furthermore, the scheduling information may be continually broadcast or downloaded using a request/reply protocol, where the controller would request particular scheduling information as the occasion arose and the Scheduling Information Source 260 would reply with that particular scheduling information. Such a protocol might be used if the Scheduling Information Source 260 is implemented as multiple distributed information sources.

User Profile(s) Storage 270 stores records for one or more users who use output means 250. Each user profile record contains preference information regarding one or more users. Examples of preference information include, but are not limited to, preferred genre (e.g., horror, romance, westerns, etc.), preferred actor(s), preferred sports teams(s), scheduling information not to be shown (e.g., a parent might restrict a child's EPG not to show the schedules of R-rated material), preferred stations/channels (e.g., a TV channel, a website, a radio station, etc.), preferred events, relative standings of preferred events, and preferred keywords (e.g., for words that show up in the descriptive information). These preferences may be entered manually by the one or more users or compiled over time by monitoring the one or more users. The User Profile(s) Storage 270 may be stored locally or remotely.

The functional module description of FIG. 2 effectively encompasses the wide variety of media presentation implementations to which the present invention is directed. As an example, the functional module description can equally be applied to an embodiment comprised of a television set connected to a CATV system, an embodiment comprised of a digital radio receiver attached to a satellite dish, and an embodiment comprised of a PC connected to the Internet, as well as a variety of other embodiments.

One improvement to this type of media system is the addition of Recommendation System 290, which suggest different channel events to the user. Recommendation System 290 may base its recommendations on generic recommendations (for any audience), such as the "Best Bets" of a newspaper, or on specific recommendations for a group or individual. Recommendation System 290 may be implemented locally, e.g., as a program run through Controller 230, or remotely, e.g. as a function performed at Media Source 210. Specific recommendations made to groups or individuals by Recommendation System 290 may be based on individual or group user preferences (either determined by preference monitoring or by direct preference input of the user or group). Exemplary recommendation values for different events on different channels are shown in Table 1, where higher numbers reflect events that have been determined to be preferred. As an example, the event $E_3$ on channel 32, which is scheduled for transmission from 9:00 to 9:30, has a recommendation value of 60 out of 100. The event in the 7:30–8:00 time slot that would be recommended to a user is event $E_1$ on channel 44 because it has the highest recommendation value (69).

TABLE 1

| Channel | Event | Scheduled Time | Recommendation Value |
|---|---|---|---|
| 32 | $E_1$ | 7:30–8:00 | 25 |
| | $E_2$ | 8:00–9:00 | 50 |
| | $E_3$ | 9:00–9:30 | 60 |
| | $E_4$ | 9:30–10:00 | 27 |

TABLE 1-continued

| Channel | Event | Scheduled Time | Recommendation Value |
|---|---|---|---|
| | $E_5$ | 10:00–11:00 | 71 |
| 44 | $E_1$ | 7:30–8:00 | 69 |
| | $E_2$ | 8:00–9:00 | 50 |
| | $E_3$ | 9:00–11:30 | 59 |
| 78 | $E_1$ | 7:30–8:00 | 10 |
| | $E_2$ | 8:00–9:00 | 40 |
| | $E_3$ | 9:00–9:30 | 83 |
| | $E_4$ | 9:30–10:00 | 50 |
| | $E_5$ | 10:00–11:00 | 66 |

One recommendation system is described in a patent application entitled Three-Way Media Recommendation Method and System (U.S. application Ser. No. 09/627,139, filed Jul. 27, 2000; hereinafter referred to as the "3-way system"), which is hereby incorporated by reference. In that system, a preference engine and processing system is used to combine three different profiles in order to generate recommendation values for each event. As shown in FIG. 3, the three different profiles are created and altered based on data received from or generated by user 300. The Feedback Module 310 maintains a profile based on the user entering Direct Event Feedback 301. Direct Event Feedback 301 comprises the ranking of an event, such as a user entering a particular score (from 1 to 10) for a particular event.

The Implicit Module 320 maintains a user behavior profile based on background monitoring of the user's behavior 302. This background monitoring is performed within the system by tracking and recording what events the user watches, and how often. In other words, user behavior 302 is nothing more than what the user instructs receiver/tuner 220 to present to him and when. This may be implemented as a simple memory/database function. For example, the user always watches a particular show on Thursday night at 8 p.m. and the memory/database records this, after a certain period of time the correlation between that particular time slot and the particular event would exceed a threshold thus indicating a preference. As a result, Implicit Module 320 would maintain a high ranking for that show in that time slot.

The Explicit Rule Module 330 maintains a profile based on the user entering explicit rules 303, or attribute-value pairs, concerning viewing preferences. These explicit rules are more detailed and complicated than the direct event feedback 301 used in the Feedback Module 310. An example of an explicit rule would be that the user likes documentary programs about political figures, but, if a game involving the N.Y. Knicks basketball team is on television, the user would prefer watching that. Such attribute-value pairs need not be tied to any particular time slot or particular event.

The three modules, the Feedback Module 310, the Implicit Module 320, and the Explicit Rule Module 330, generate respective recommendations, Feedback Module Recommendations 315, Implicit Module Recommendations 325, and Explicit Rule Module Recommendations 335. These recommendations are combined by Combiner 340 in order to generate final recommendation values 350. Thus, each event will have a related recommendation value. The manner in which Combiner 340 combines the input recommendations is open to a wide variety of mathematical and algorithmic forms. For example, Combiner 340 may use suitable mathematical forms to appropriately weight different factors and/or profile recommendations, and then sum the resulting weighted recommendations.

The output per event of the 3-way system (and conventional recommendation systems) is a one-dimensional value that does not change during the time the event is broadcast. In other words, if the recommendation value of an event is 5 when the event begins, it is still 5 when the event is about to end. This is shown graphically in FIGS. 4A–4C where the recommendation values $R_{Ex}$ for the events $E_x$, in Table 1 are charted over time.

An improvement over the limitations of one-dimensional recommendation values output by conventional recommendation systems is disclosed in the patent application entitled Recommender System using "Fuzzy-Now" for Real-Time Events (U.S. application Ser. No. 09/730,676 filed Dec. 6, 2000; hereinafter referred to as the "Fuzzy-Now system"), which is hereby incorporated by reference. In that disclosure, a "Fuzzy-Now" Function Module 295 is added to the system shown in FIG. 2. The "Fuzzy-Now" Function Module 295 maintains and adapts Fuzzy-Now functions which will be applied to the one-dimensional values generated by conventional recommendation systems.

These Fuzzy-Now functions yield a weighting factor to be applied to current viewing recommendations. Because it is based on time, the Fuzzy-Now function typically varies over time and that variation is typically related to the starting and ending times for an event. An exemplary and simple Fuzzy-Now function for an event is shown in FIG. 5. In FIG. 5, there is an event occurring over time period ($t_{end}$–$t_{start}$) with a starting time of $t_{start}$ and an ending time of $t_{end}$. There is also a waiting starting time of $t_{wait\_start}$, representing the moment in time before the event starts when the user would begin to have some preference for turning to the channel that is about to show that event. $t_{wait\_start}$ is determined by subtracting threshold time $t_{threshold}$ from the $t_{start}$ of the event, where $t_{threshold}$ is the total amount of time that the user is willing to wait for the event to start.

The Fuzzy-Now function in FIG. 5 produces a weighting factor w for the event over time, with, for example, 1 being the most preferred and 0 being not preferred at all. In one aspect, the Fuzzy-Now function might be considered to represent the answer to the question: "how enjoyable is this program if I start watching it (or start waiting for it) now?". The assumption behind the Fuzzy-Now function of FIG. 5 is that the user prefers to see the start of an event, and that his or her interest wanes from that point onward, as indicated by slope 503. Slope 502 indicates the user's willingness to wait before the event begins. If it is before the waiting start time $t_{wait\_start}$, the user is not willing to wait at all. After waiting start time $t_{wait\_start}$, the user is increasingly willing to wait as the amount of remaining waiting time decreases. Another simple Fuzzy-Now function might have a plateau in slope 503 to indicate a continued and constant enjoyment level.

This is a simple Fuzzy-Now function because it merely has straight line slopes connecting key times of the event (the key times being $f(t_{start})=1$, $f(t_{end})=0$, and $f(t_{wait\_start})=0$). There may be far more complex Fuzzy-Now functions based on different assumptions. For example, the user may enjoy the final Jeopardy round of the Jeopardy television show more interesting than the other Jeopardy rounds. Because the final Jeopardy round occurs roughly five minutes before the end, the peak of the Fuzzy-Now function for Jeopardy may occur there, rather than $t_{start}$. In the same vein, the user may be more interested in watching the end of sports events or the final climax of a movie rather than the beginning.

FIGS. 6A–6C show more complex Fuzzy-Now weighted functions $w=f_w(E_x)$ for the same events $E_x$ on the same channels and the same particular time period as FIGS. 4A–4C. It is unlikely that there would be as wide a disparity between Fuzzy-Now functions as is shown between the individual Fuzzy-Now functions in FIGS. 6A–6C; however, the variety of shapes makes it easier to understand the process. Furthermore, for convenience, the weighted functions in FIGS. 6A–6C only apply to the time period between the start time and the end time of the event, and not the waiting time before the event starts ($t_{start}$–$t_{threshold}$=$t_{wait\_start}$ in FIG. 5).

As an example of a more complex Fuzzy-Now function, event $E_1$ on channel 32 between 7:30 and 8:00 in FIG. 6A has a Fuzzy-Now weighted function $f_w(E_1)$ which shows increasing interest for the first 15 minutes of the event (610), and then a sustained plateau of interest during the last 15 minutes of the event (620). As another example, in FIG. 6B, event $E_2$ on channel 44 between 8:00 and 9:00 has a Fuzzy-Now weighted function $f_w(E_2)$ with a slowly decreasing interest curve 640. Because it is used to weight the recommendation values, the Fuzzy-Now function $w=f_w(E_x)$ varies between 0 and 1 (as shown by the y-axis in FIGS. 6A–6C) so that events will only have their total recommendation value when the Fuzzy-Now function is highest (w=1) and will have no recommendation value when the Fuzzy-Now function is lowest (w=0).

Lastly, FIGS. 7A–7C show the final recommendation functions $f_R(E_x)=f_w(E_x)*R_{Ex}$ for each event on each channel of Table 1 and FIGS. 4 and 6. The recommendation function $f_R(E_x)$ (FIGS. 7A–7C) of an event $E_x$ is calculated by applying (i.e., multiplying) the weighted Fuzzy-Now function $f_w(E_x)$ (FIGS. 6A–6C) for that event $E_x$ to the recommendation value $R_{Ex}$ (FIGS. 4A–4C) of that event $E_x$. For example, in FIG. 7A, the recommendation function $f_R(E_1)$ 720 of event $E_1$ on channel 32 between 7:30 and 8:00 equals the recommendation value $R_E=25$ (401 in FIG. 4A) multiplied by the Fuzzy-Now function $f_w(E_1)$ (601 in FIG. 6A). Thus, although the last fifteen minutes of event $E_1$ on channel 32 show the greatest amount of interest (620 in FIG. 6A), the recommendation value for $E_1$ is only 25 (401 in FIG. 4A), so those fifteen minutes have a final recommendation function value of 25 (725 in FIG. 7A).

However, neither of these systems address the impact of the personal schedule of the user on the user's personal preferences. In other words, the time the user arrives home and turns on the TV, the time the user turns off the TV on particular nights, has an effect on what the user may, or may not, enjoy. These incidents correlate with extra-media programming personal events in the user's life, such as meal time, bedtime, periodic meetings (P.T.A., cub scout, etc.), poker night, etc. Therefore, there is a need to receive the personal schedule of a user and incorporate the received personal schedule into the recommendation procedure. The schedule may be received by monitoring the personal schedule of the user or direct input by the user.

SUMMARY OF THE INVENTION

An object of the present invention is to provide a recommendation system and method that addresses the impact of the personal schedule of the user on the user's personal preferences.

Another object of the present invention is to provide a recommendation system and method and system that monitors the personal schedule of the user and incorporates the personal schedule into the recommendation system and method.

Yet another object of the present invention is to provide a recommendation system and method that integrates these two systems and extends the functionality of each.

These and other objects are achieved by an system and method for recommending a media presentation event to a user. According to one aspect of the invention, a personal schedule modification system and a personal schedule module are added to a recommendation system consisting of the combination of the 3-way system and Fuzzy-Now system. The personal schedule module either receives personal scheduling data (of correlations between user scheduling preferences and events) directly input by the user or detects and records correlations between user actions, such as turning on and off the TV set, and media programming events. An appropriate weighting factor is generated for the events in the correlation. When a correlation is recognized, the appropriate weighting factor is applied to the Fuzzy-Now recommendation function of the events in the recognized correlation.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings:

FIG. 10A is an example of how the Personal Schedule Modification System modifies a Fuzzy-Now Recommendation Function to create a Final Recommendation Function according to an embodiment of the present invention;

DETAILED DESCRIPTION OF THE PRESENTLY PREFERRED EMBODIMENTS

The present invention is directed to a system and method of making recommendations by using the combination of the Fuzzy-Now system, the 3-way system, and the personal schedule of the user. The personal schedule may be generated by monitoring the user's behavior or by direct input. When monitoring user behavior, the system and method records incidents (including single actions, recurring actions, or intermittent actions) in the personal schedule of the user, and uses these incident records to modify how the Fuzzy-Now recommendation functions are being calculated.

By monitoring incidents, the present system and method can incorporate the personal schedule of the user into the recommendation procedure, and, thus, even more accurately reflect the personal preferences of the user. How this is done will become clear in the description of the presently preferred embodiments below.

Figure 1:
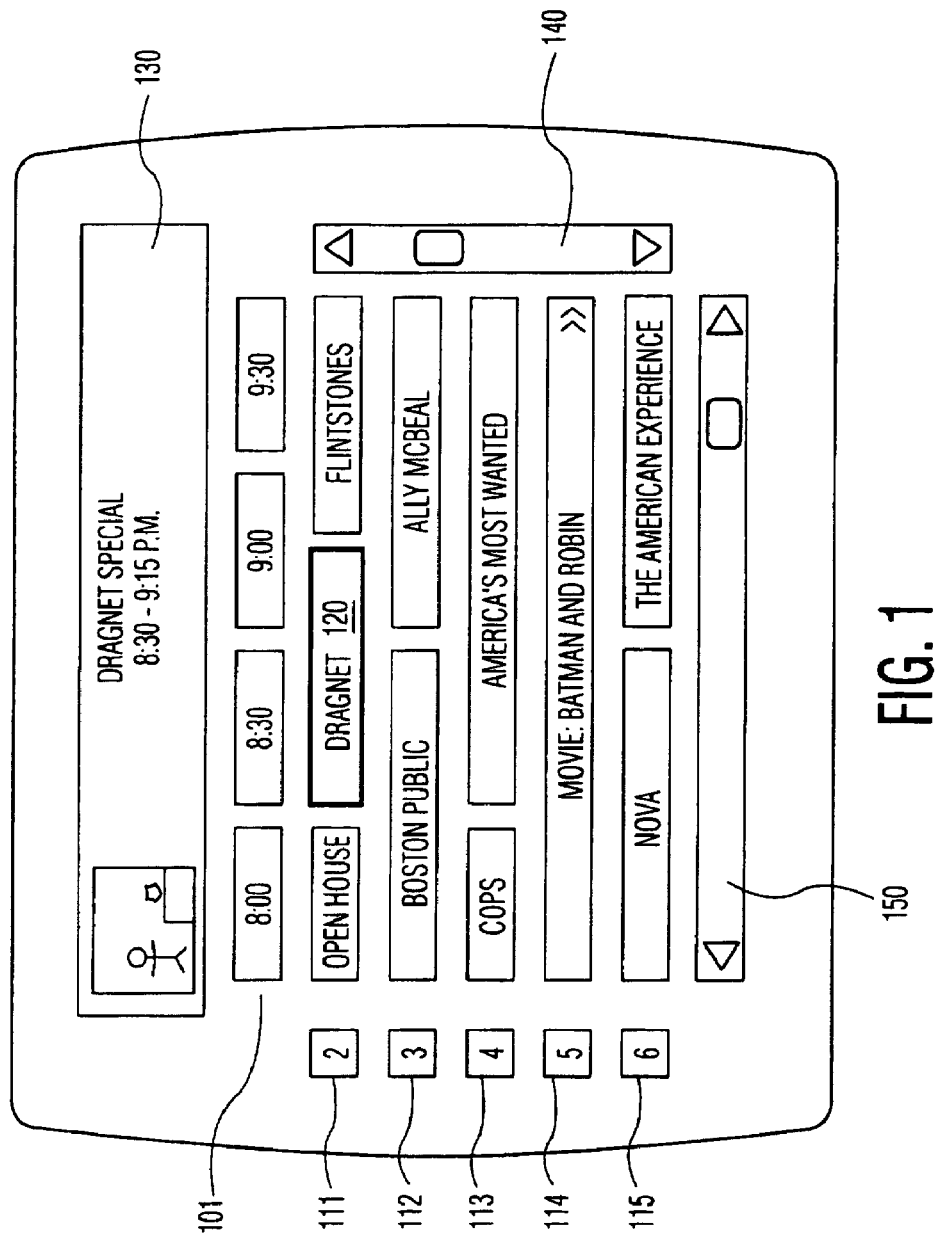
FIG. 1 is an exemplary conventional Electronic Programming Guide (EPG) Graphical User Interface (GUI)
Figure 2:
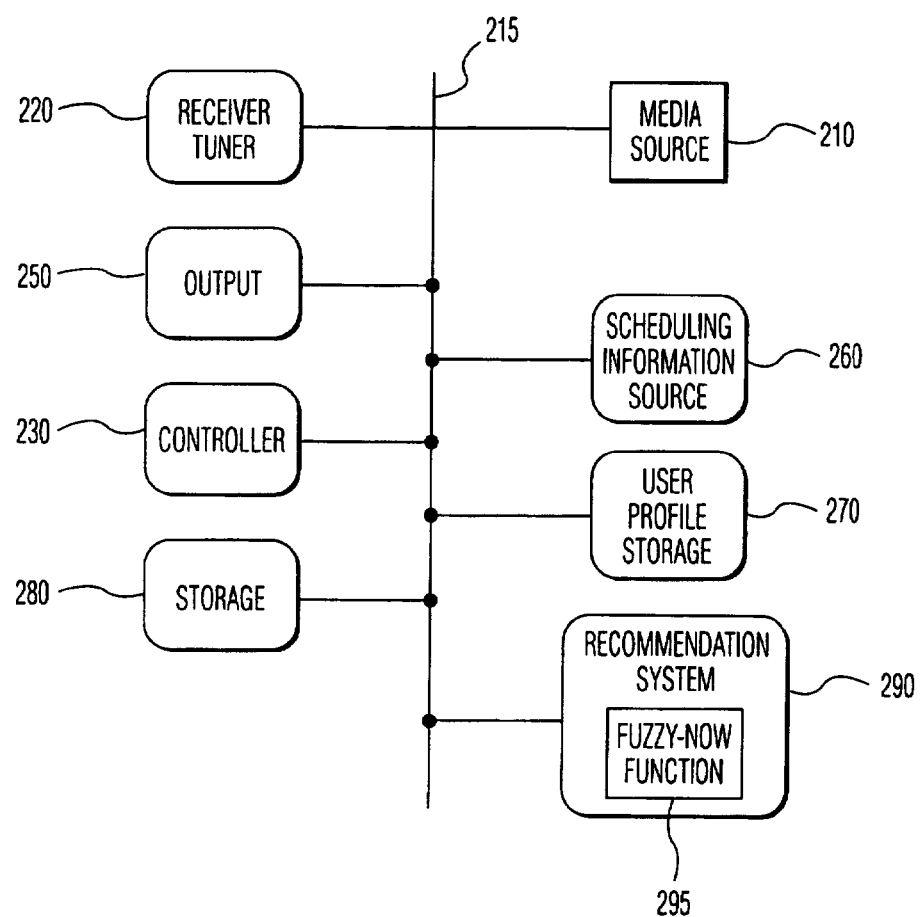
FIG. 2 is a block diagram of the relevant functional modules in a prior art media entertainment system that employs an EPG GUI.
Figure 3:
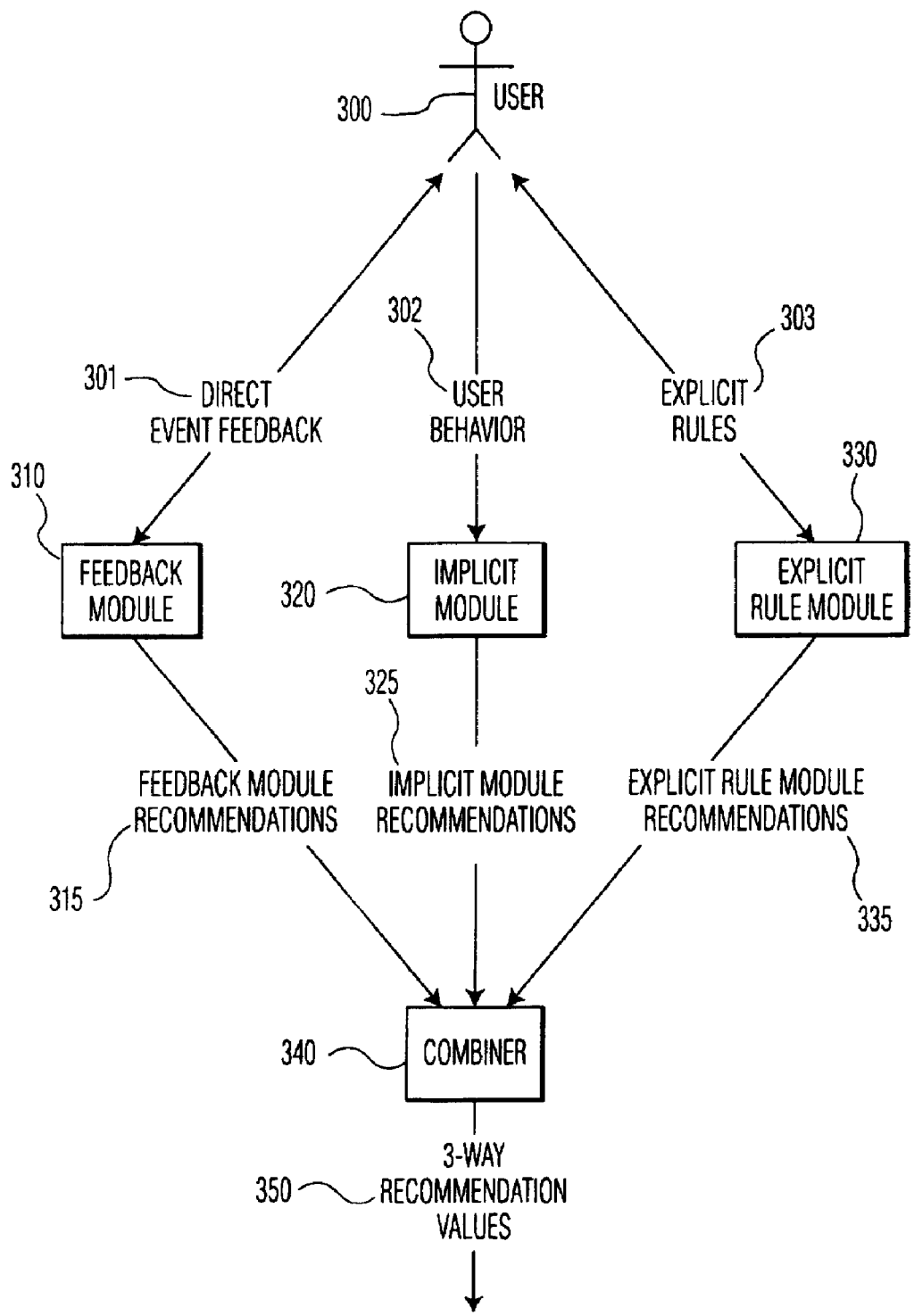
FIG. 3 is a block diagram of the relevant functional modules according to an embodiment of the 3-way system.
Figure 4A:
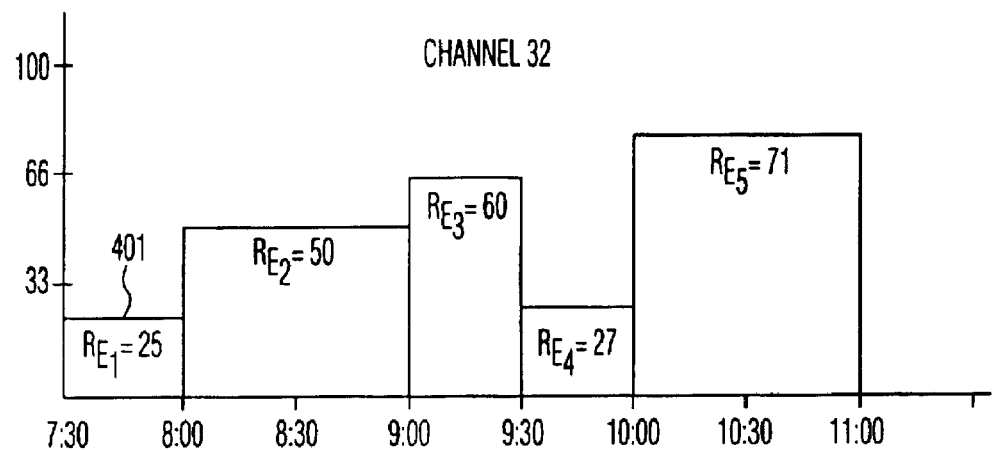
FIGS. 4A–4C are the recommendation values for events on three particular channels during a particular period of time.
Figure 4B:
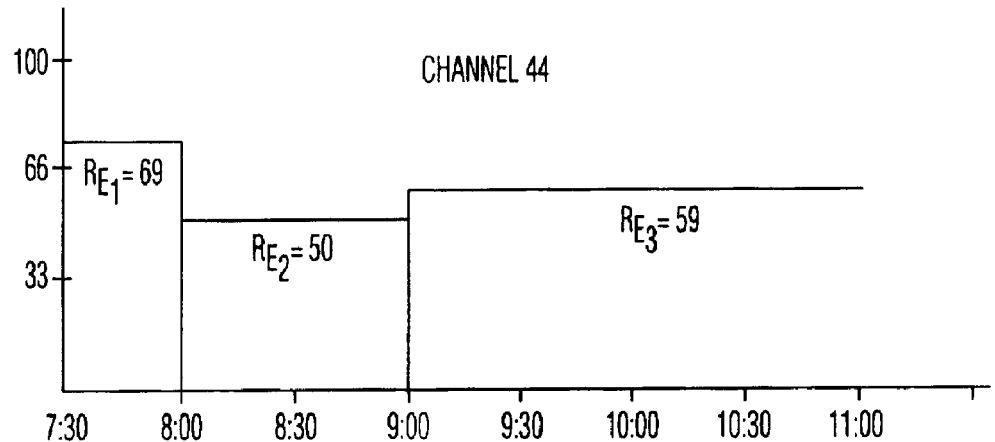
Figure 4C:
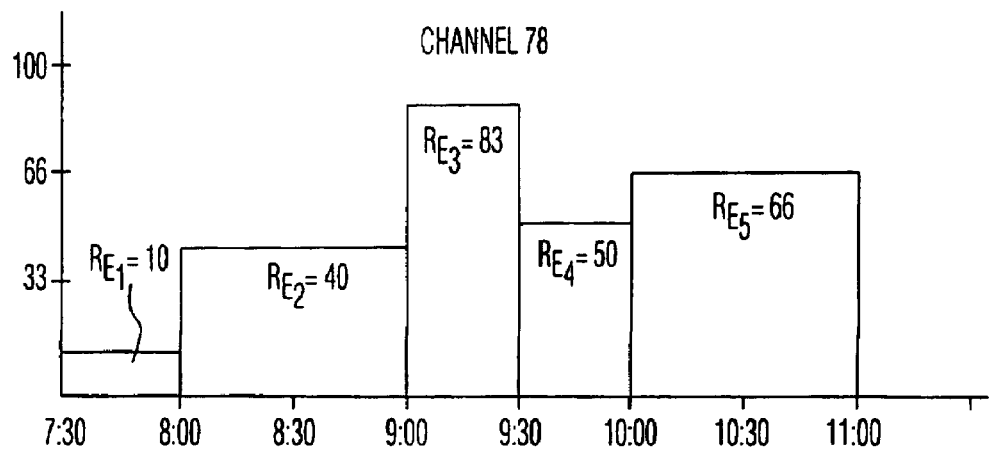
Figure 5:
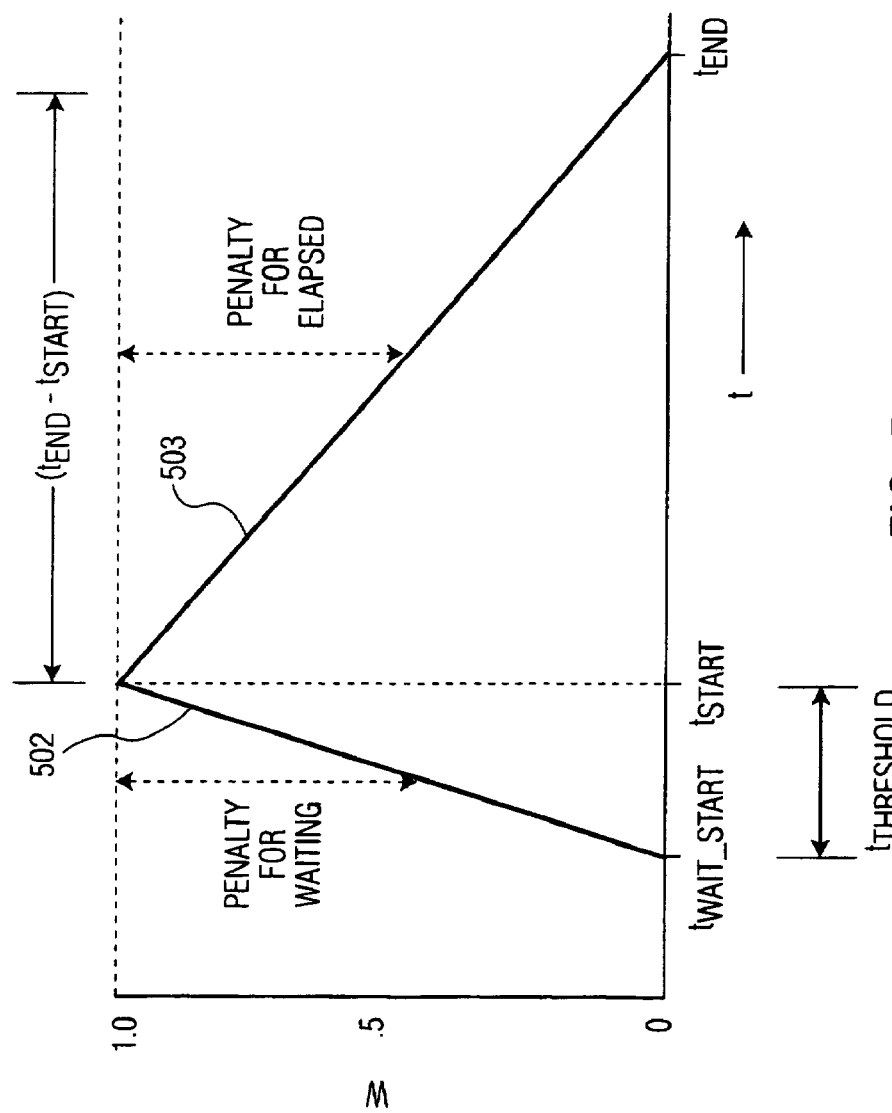
FIG. 5 shows a simple exemplary Fuzzy-Now function for an event.
Figure 6A:
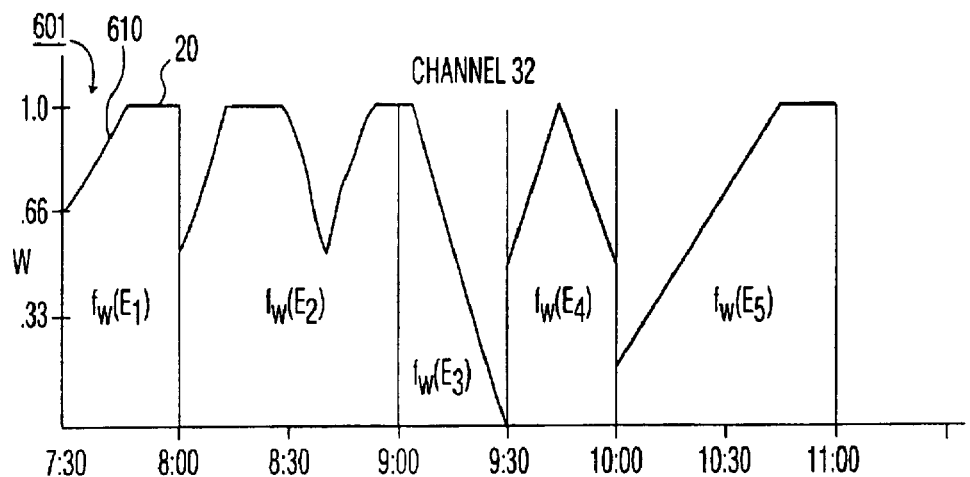
FIGS. 6A–6C are the Fuzzy-Now weighted functions for the same channels as FIGS. 4A–4C for the same particular time period.
Figure 6B:
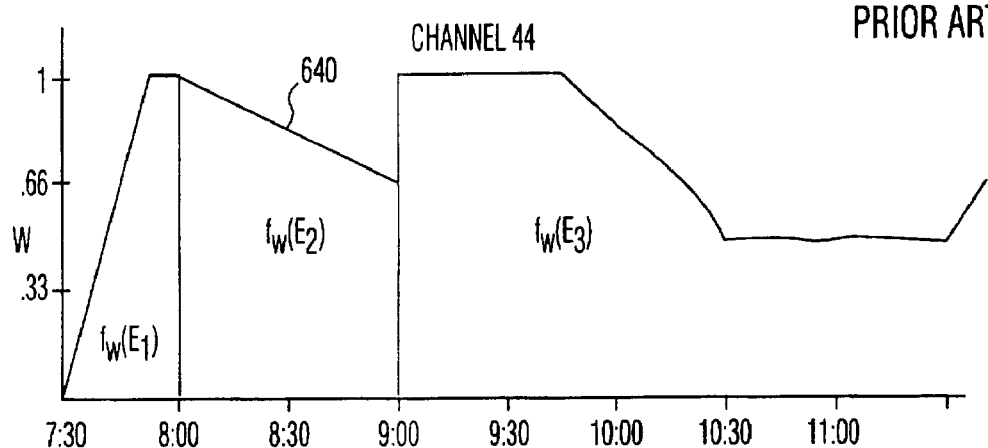
Figure 6C:
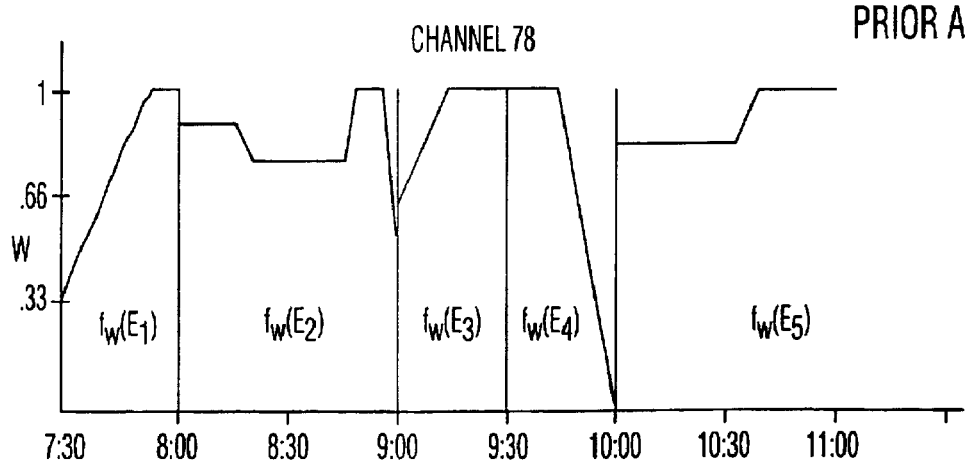
Figure 7A:
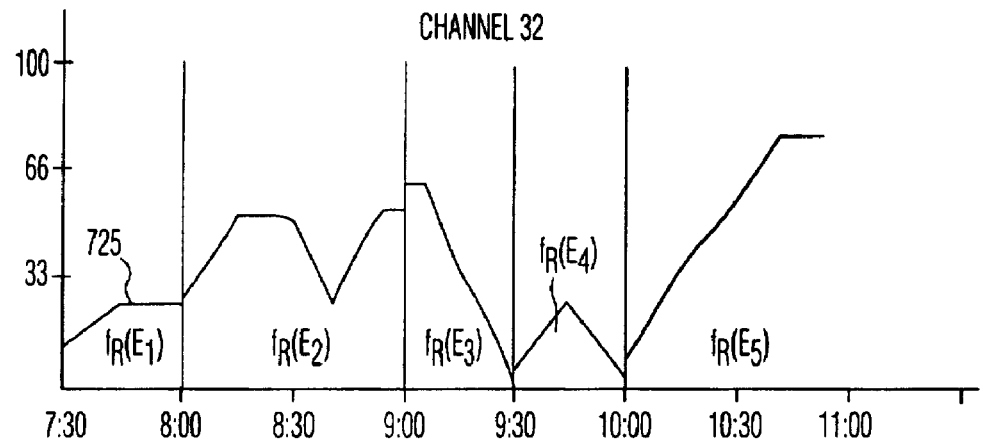
FIGS. 7A–7C are the final recommendation functions calculated by applying the weighted functions of FIGS. 6A–6C to the recommendation values of FIGS. 4A–4C.
Figure 7B:
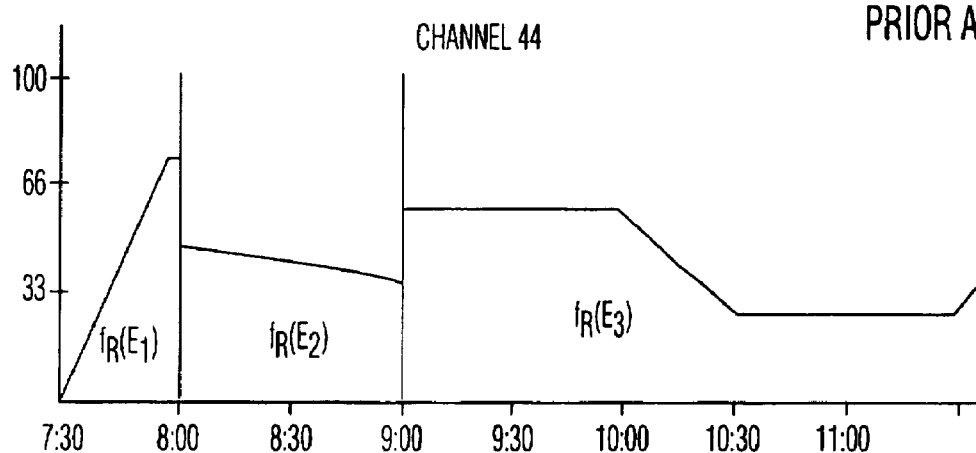
Figure 7C:
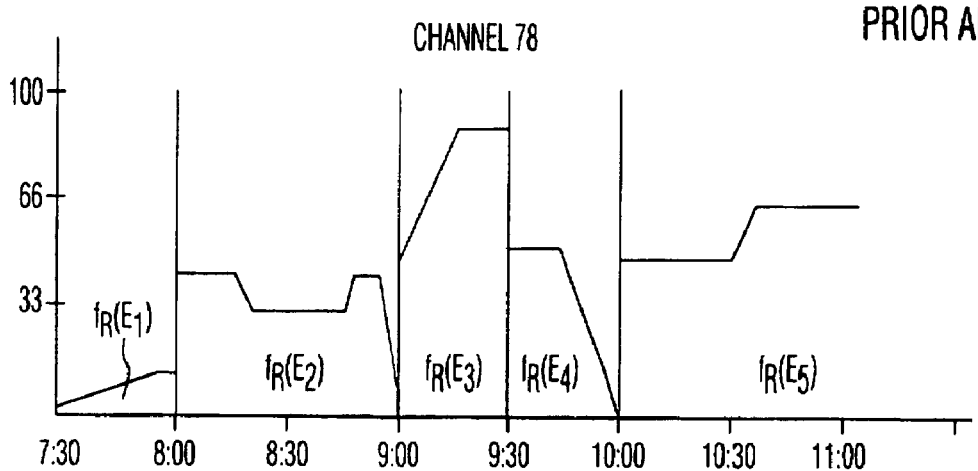
Figure 8:
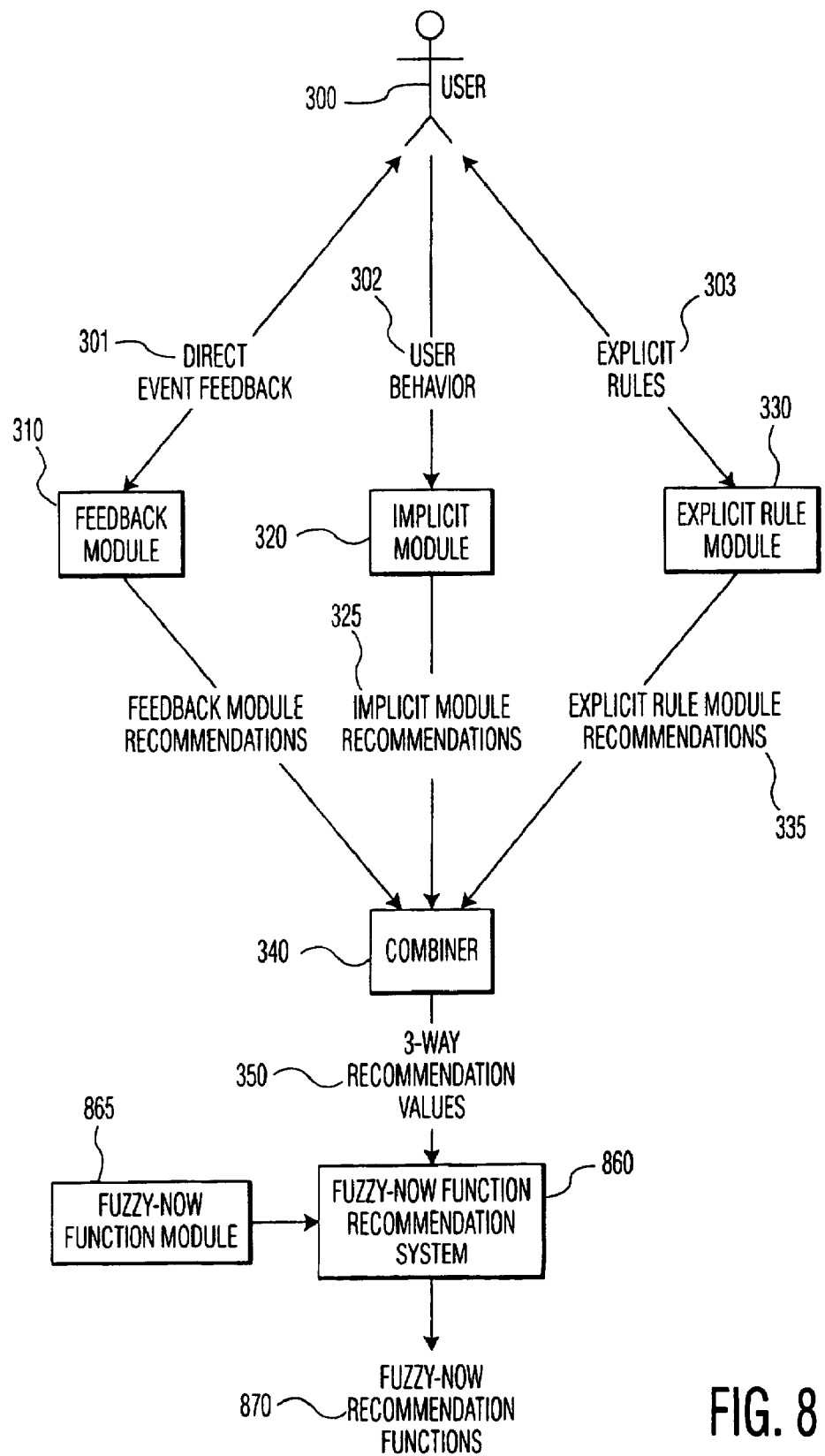
FIG. 8 is a block diagram of the relevant functional modules in a combination of the 3-way system and the Fuzzy-Now system according to an embodiment of the present invention.

In the presently preferred embodiment of the system according to the present invention, the Fuzzy-Now system and the 3-way system are combined as shown in FIG. 8. In FIG. 8, a Fuzzy-Now Function Recommendation System 860 is added in order to receive the 3-Way Media Recommendation Values 350 output from Combiner 340. Then the Fuzzy-Now Function Recommendation System 360 applies the appropriate Fuzzy-Now functions taken from Fuzzy-Now Function Module 865 to the 3-Way Media Recommendation Values 850 in order to generate Fuzzy-Now Recommendation Functions 870. This process of generating 3-Way Media Recommendation Values 350, and applying the appropriate Fuzzy-Now functions to those Values 350 in order to generate Fuzzy-Now Recommendation Functions 870 is similar to the process described in reference to FIGS. 4A–4C, 6A–6C, and 7A–7C. In other words, recommendation values, such as are in FIGS. 4A–4C, are generated by the 3-way system, and the Fuzzy-Now system applies appropriate Fuzzy-Now functions, such as FIGS. 6A–6C, to the recommendation values in order to generate recommendation functions, such as FIGS. 7A–7C. In the examples given in FIGS. 4A–4C, 6A–6C, and 7A–7C, the application of the Fuzzy-Now functions to the recommendation values is merely multiplication, so that the Fuzzy-Now functions perform as weighting functions; however, any type of calculation or mathematical manipulation may be used in the application of the Fuzzy-Now functions to the recommendation values.

In the Fuzzy-Now system, the Fuzzy-Now functions (e.g., FIGS. 6A–6C) may be generated in a myriad of ways: monitoring the user, receiving best bets from a media source, tracking interest over time, etc. In fact, the exact manner of generating the specific values and functions in that disclosure is not limited or defined in any way so that it may apply to any system or method of generating the specific values and functions $f_R(E_x)$, $f_w(E_x)$, and $R_{Ex}$. However, when combined with the 3-way system, it is preferable for the Fuzzy- Now Recommendation System 860 to use some of the functionality of the 3-way system to generate and update its Fuzzy-Now functions.

Figure 9:
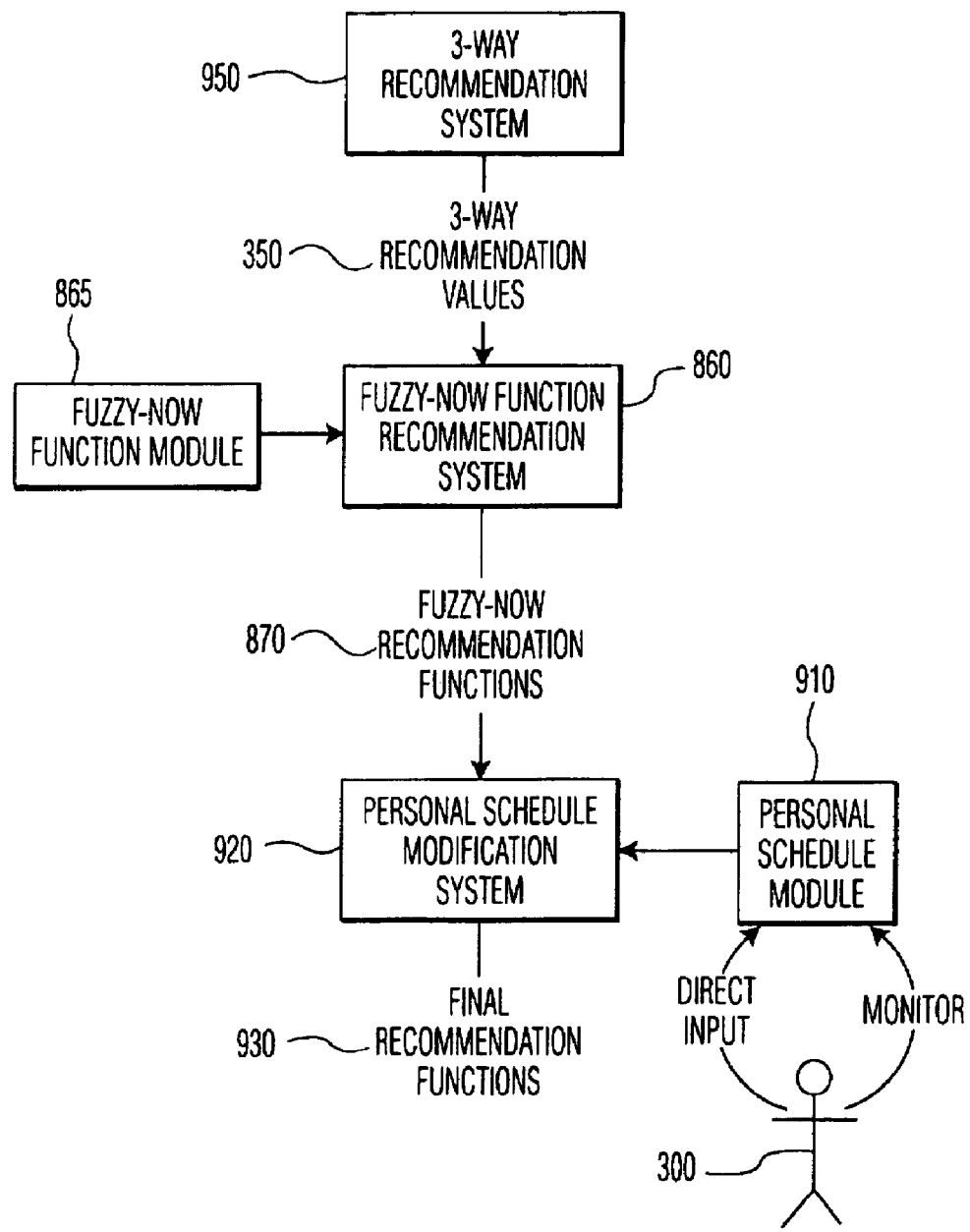
FIG. 9 is a block diagram of the relevant functional modules of the combination of FIG. 8 with the Personal Schedule Modification System and Personal Schedule Module according to an embodiment of the present invention.

FIG. 9 shows the system of FIG. 8 with the addition of Personal Schedule Module 910 and Personal Schedule Modification System 920. The components of the 3-way system have been consolidated into one box 950. The Personal Schedule Module 910 contains the personal schedule data of the user, which is used by the Personal Schedule Modification System 920 to modify the Fuzzy-Now Recommendation Functions 870 in order to create Final Recommendation Functions 930. The personal schedule data is either entered directly by user 300, extracted from data from monitoring user 300, from data extracted from another electronic schedule-keeper, such as a PDA, or a combination. The simplest embodiment would be user 300 directly inputting all the personal schedule details into the Personal Schedule Module 910.

In embodiments where user 300 is monitored, events, or "incidents", are recorded and incorporated into the personal schedule maintained by Personal Schedule Module 910. Similarly to the Fuzzy-Now Recommendation System 860, Personal Schedule Module may use some of the functionality of the 3-way system to monitor user 300, or to generate and update the personal schedule. User 300 is monitored by sensors directly connected to the media presentation system and/or placed separately from the media presentation system. The events, or incidents, in the personal schedule of the user are monitored by these sensors in order either to augment or to generate the personal schedule. In one embodiment, the sensor comprises a simple memory/database module attached to receiver/tuner 220. The module would record when the user turns on and off the receiver/tuner 220. In such an embodiment, the assumption is made that the turning on and off of receiver/tuner 220 corresponds to different incidents. For example, if during the week the user always turns on the receiver/tuner 220 at 6 p.m. and watches event X at 7:30 p.m. except when the user turns on receiver/tuner 220 at 7:15 p.m. and watches event Y at 7:30 p.m., the system assumes from this recurring action that the recommendation function for events X and Y will vary depending on when the receiver/tuner was turned on. As another example, the user may turn off the TV set at 10:30 p.m. on Thursdays, except when an old movie is playing. In this example, the recommendation functions will vary depending on when the TV set is turned off.

In another embodiment, the sensors for recording incidents may comprise sensors that actually indicate when a user arrives home, such as an electronic monitor that is triggered when the front door is opened or a light turned on, or a physical-presence sensor such as an IR detector used in home security, etc. A wakeup time or bedtime may be determined by electronically readable settings such as may be read from some televisions. In such an embodiment, monitored incidents comprise the time a TV is turned on or off and the day of the week, and, if there are multiple TVs in the household, which TV is turned on. In an embodiment with multiple TV monitoring, the system may try to correlate preferences to which TV is used. For example, a user may prefer to watch the nightly news when watching the TV set in the bedroom at around 11 p.m., because the user is about to fall asleep. But, if the user is watching the TV set in the living room at around 11 p.m., the user may be restive and desire to watch a movie. Through monitoring over a period of time, the correlation between which event or class of events is preferred (news or movies) and the recurring action (the particular TV set being turned on—either bedroom or living room) would exceed a threshold thus indicating a preference. As a result, the Personal Schedule Module 910 would maintain a different weighting factor for news shows and movies depending on which receiver/tuner was turned on.

Figure 10B:
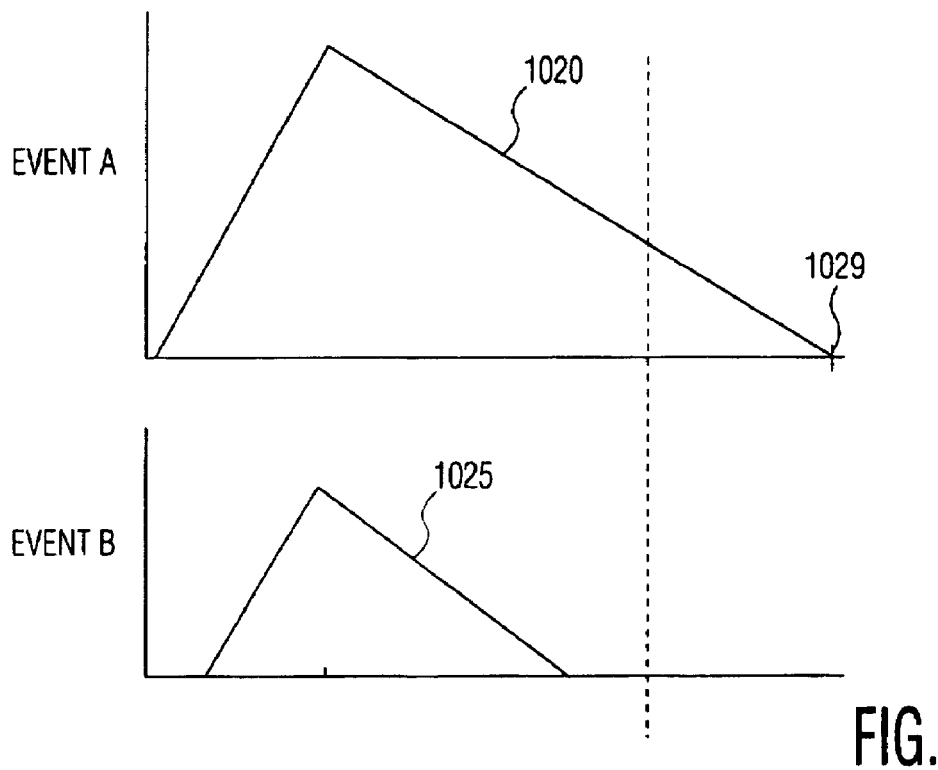
FIGS. 10B and 10C are another example of how the Personal Schedule Modification System modifies a Fuzzy-Now Recommendation Function to create a Final Recommendation Function according to an embodiment of the present invention.

The Personal Schedule Modification System 920, using the personal schedule maintained by the Personal Schedule Module 910, modifies the Fuzzy-Now Recommendation Functions 870 in order to create Final Recommendation Functions 930. Examples of this are demonstrated in FIGS. 10A, 10B & 10C and FIGS. 11A & 11B. FIG. 10A shows a Fuzzy-Now Recommendation Function 1010 generated for an event, which starts at time 1011 and ends at time 1012, on a particular channel. When this Function 1010 is input to Personal Schedule Modification System 920, the Personal Schedule Modification System 920 determines from the personal schedule maintained by the Personal Schedule Module 910 that the user's bedtime is at time 1015, before the time 1012 that the event ends. Having determined this, the Personal Schedule Modification System 920 linearly decreases the Fuzzy-Now Recommendation Function 1010 to Final Recommendation Function 1019. The linear decrease taken by Personal Schedule Modification System 920 ensures that the event will properly reflect the user's decreasing interest as the user's bedtime approaches. However, other ways of modifying, such as those shown FIGS. 10B & 10C and FIGS. 11A & 11B, may be used. These are only examples of ways of modifying the recommendation functions input to the Personal Schedule Modification System 920, and many other ways are possible.

Figure 10C:
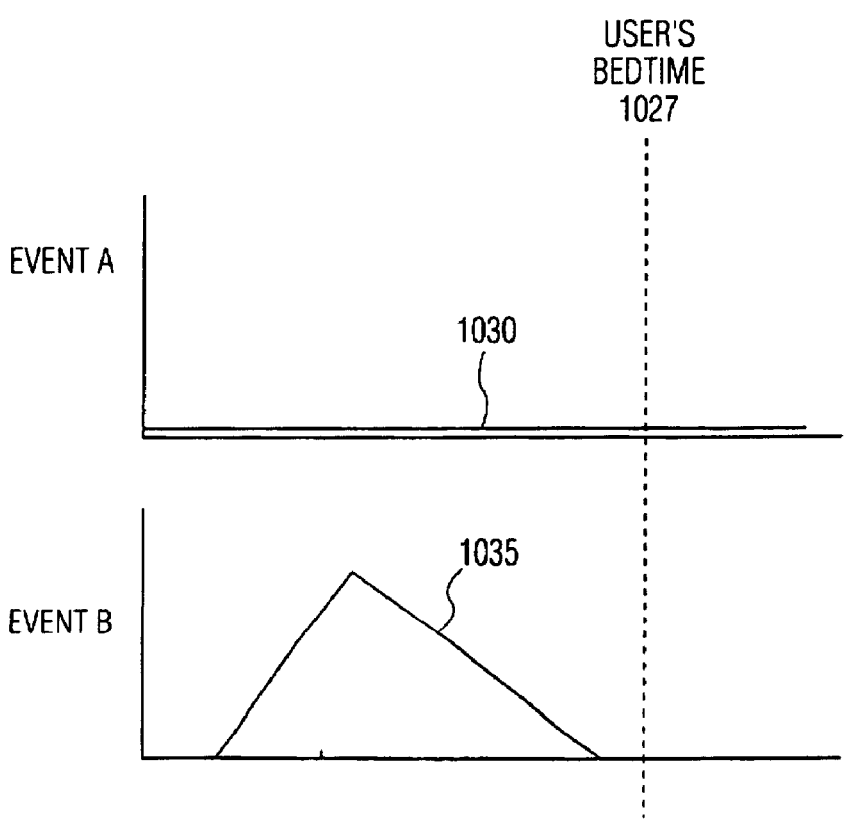

FIG. 10B shows the Fuzzy-Now Recommendation Functions, before modification, for two events on two channels and FIG. 10C shows the Final Recommendation Functions, after modification, for the same two events on the same two channels. In FIG. 10B, event A has Fuzzy-Now Recommendation Function 1020 and event B has Fuzzy-Now Recommendation Function 1025. When Functions 1020 and 1025 are input to Personal Schedule Modification System 920, the Personal Schedule Modification System 920 determines that the user's bedtime is at time 1027, before the time 1029 that event A ends. Having determined this, the Personal Schedule Modification System 920 zeroes out Fuzzy-Now Recommendation Function 1020 so that Final Recommendation Function 1030 is zero, as shown in FIG. 10C. The Final Recommendation Function 1035 in FIG. 10C for event B is the same as its Fuzzy-Now Recommendation Function 1025 in FIG. 10B.

Figure 11A:
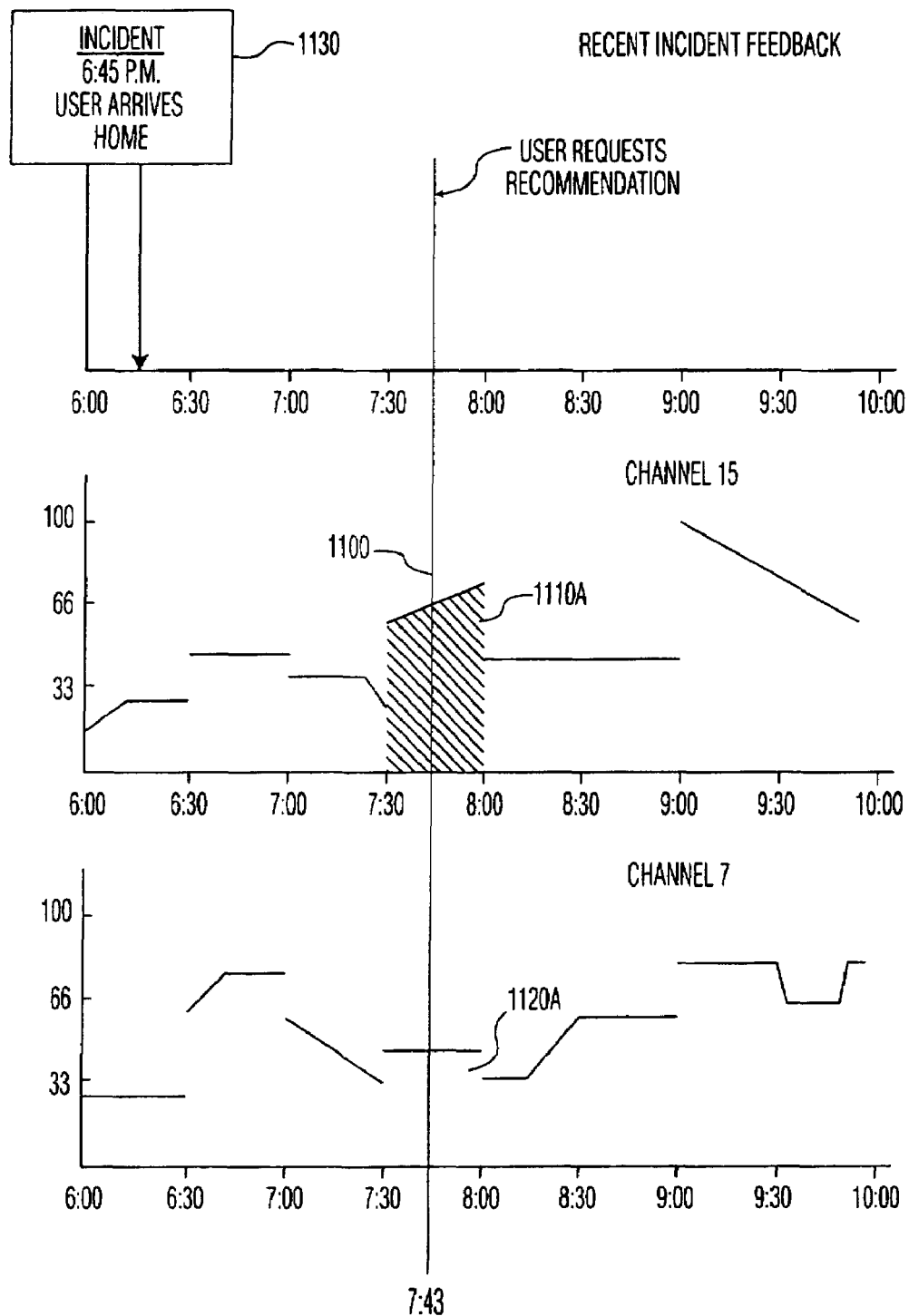
FIGS. 11A and 11B are yet another example of how the Personal Schedule Modification System modifies a Fuzzy-Now Recommendation Function to create a Final Recommendation Function according to an embodiment of the present invention.
Figure 11B:
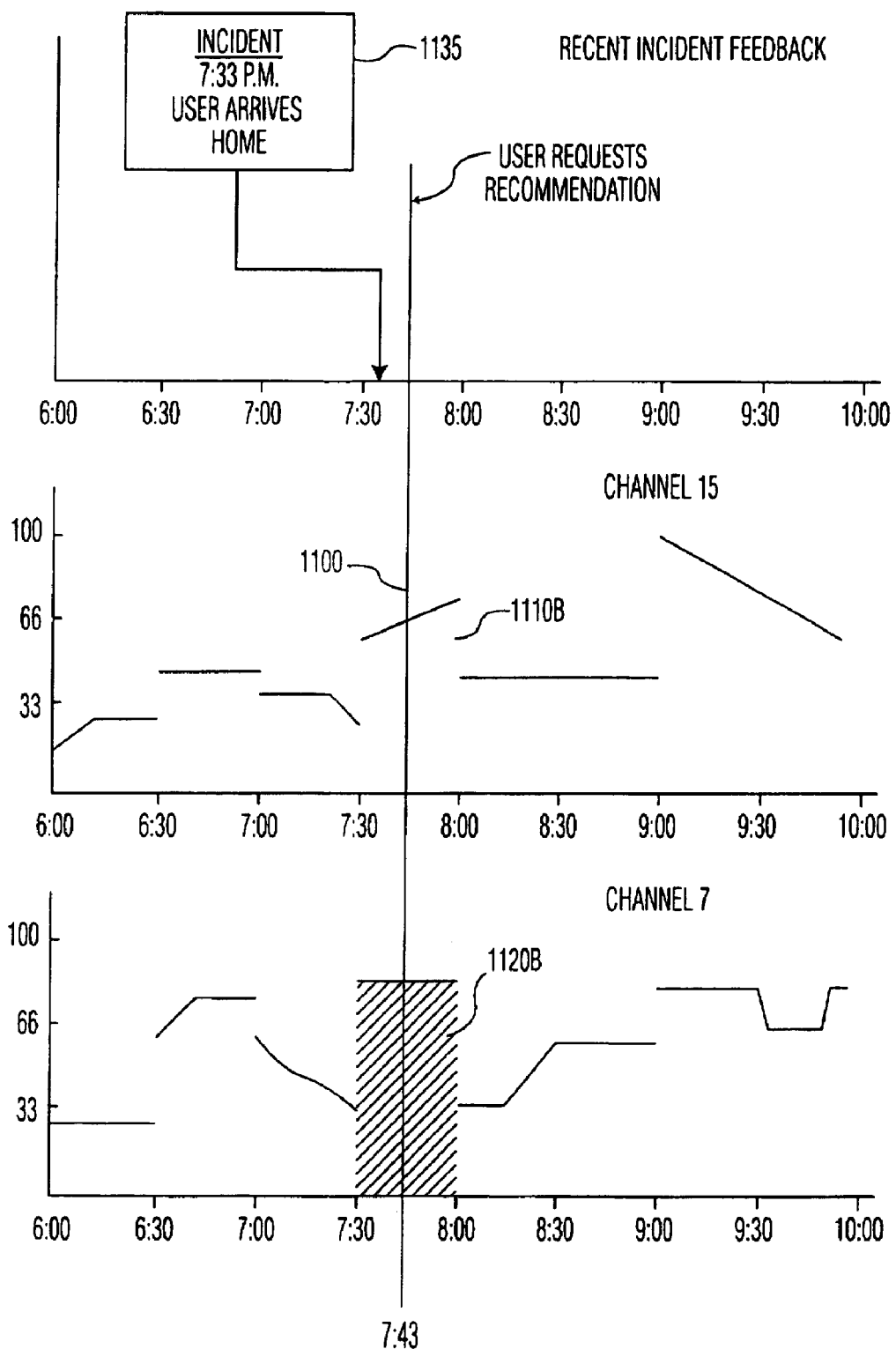

A more complex example is shown in FIGS. 11A and 11B. In this example, the Personal Schedule Module 910 is monitoring the user in real-time. Thus, recent actions taken by the user (incidents) are taken into account by Personal Schedule Modification System 920 when modifying the Fuzzy-Now Recommendation Functions. Each of FIGS. 11A and 11B show the Final Recommendation Functions generated for the same events on the same channels (Channels 7 and 15). In addition, a time chart showing recently monitored incidents is shown at the top of each figure. In both FIG. 11A and 11B, the user, at 7:43 p.m. (as shown by line 1100), requests that the system generate an event recommendation.

In FIG. 11A, as shown in the recent incident time chart, the system has monitored an incident 1130 at 6:45 p.m. indicating that the user has arrived home. As discussed above, the system may register this in different ways. There could be electronic sensors that indicate when the user's car garage is entered. On the other hand, in a simple embodiment, the system may only register the fact that the TV set was turned on. By contrast, in FIG. 11B, as shown in the recent incident time chart, the system has monitored an incident 1135 at 7:43 p.m. indicating that the user has arrived home. Thus, at 7:43 p.m., the user has presumably been at home watching TV for about an hour in FIG. 11A, whereas the user has just come home and turned on the TV set in FIG. 11B.

Because of this difference in recently monitored incidents, the system will generate different recommendation functions in FIGS. 11A and 11B. This is because Personal Schedule Module 910, based on past user actions, has determined that there is a correlation between when the user arrives home (or turns on the TV set) and what show the user prefers to see at 7:30 p.m. Namely, the system has found the pattern that the user prefers the 7:30 p.m. news show on channel 7 when the user arrives home after 7 p.m., but prefers the 7:30 p.m. game show on channel 15 when the user arrives home before 7 p.m. Therefore, different weighting factors will be applied to the recommendation functions 1110 and 1120 of those events in FIGS. 11A and 11B, as will be discussed below.

In FIG. 11A, the recommendation function 1110A of the channel 15 event filling the time slot from 7:30 to 8:00 has a higher value at the point in time 1100 than the recommendation function 1120A of the channel 7 event filling the time slot from 7:30 to 8:00. In this example, the channel 15 event is a game show where the user enjoys the end more than the beginning, as shown by the upward slope of the recommendation function. The channel 7 event is a news program. If these two events were the highest ranked shows at time 1100, the channel event would be chosen as the recommended show over the channel 7 event because its recommendation function 1110A is greater than recommendation function 1120A.

By contrast, in FIG. 11B, the recommendation function 1110B of the channel 15 event, the game show, has a lower value at point in time 1100 than the recommendation function 1120B of the channel 7 event, the news program. As discussed above, this is because the incident history shows that when the user comes home later than 7:00 p.m. (as indicated by, e.g., the turning on of the TV), the user prefers to watch the news program on channel 7, because the user has missed the previously broadcast news programs. Therefore, the system applies a weighting factor to the Fuzzy-Now function for the channel 7 news program when generating the recommendation functions. This weighting factor will increase the value of the recommendation function 1120B of the channel 7 news show. In FIG. 11B, the system has registered the fact that the user has come home after 7:00 p.m., so the system applies an additional weighting factor (which is greater than 1) to the recommendation function 1120B of the channel 7 news program. This additional weighting factor brings the recommendation value of the news program at point in time 1100 to over 66, in comparison to being around 40 in FIG. 11A. This insures that the channel 7 news program will be recommended over almost all other programming by the system. It is also possible that the additional weighting factor could diminish one or more events, or increase some events but decrease others.

Figure 12:
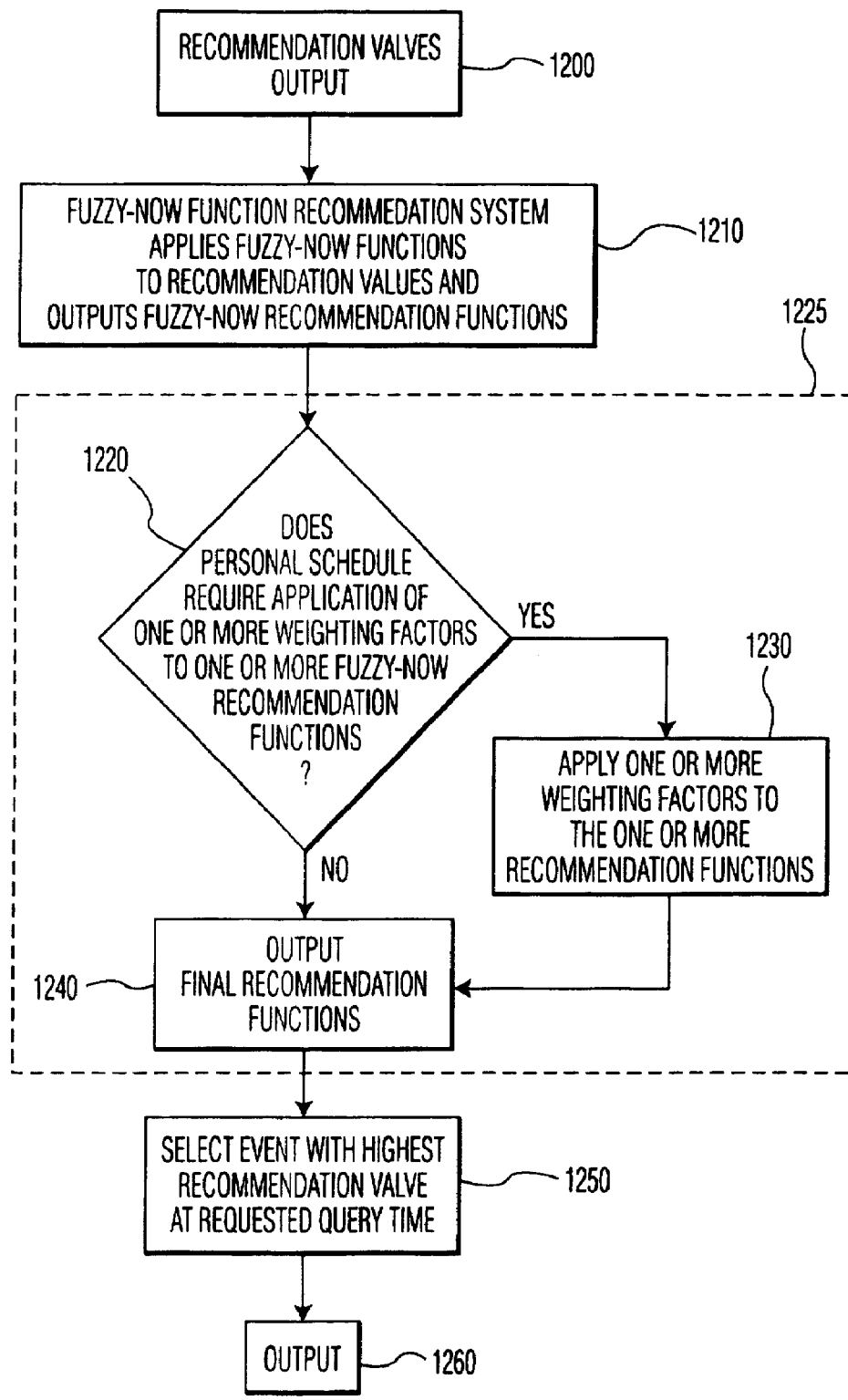
FIG. 12 is a flowchart of the steps employed in a method according to an embodiment of the present invention.

FIG. 12 shows the steps in a method according to one embodiment of the present invention. It should be clear, however, that these steps may be performed in a different order, and may be divided into multiple sub-steps or combined into a fewer number of more comprehensive and inclusive steps, and still be within the scope of the present invention. In step 1200, the 3-way recommendation system outputs its recommendation values. The Fuzzy-Now Function Recommendation System 860 receives these values, applies the appropriate Fuzzy-Now functions from the Fuzzy-Now Function Module 865, and outputs the resulting Fuzzy-Now recommendation functions in step 1210.

The next steps in the method are performed by the Personal Schedule Modification System, as indicated by dashed line box 1225. In step 1220, the Personal Schedule Modification System determines if at least one weighting factor needs to be applied to at least one Fuzzy-Now recommendation function. If it is determined that at least one weighting factor needs to be applied to at least one Fuzzy-Now recommendation function, the Personal Schedule Modification system applies the appropriate at least one weighting factor to the at least one Fuzzy-Now recommendation function in step 1230. In step 1240, the Personal Schedule Modification System outputs the final recommendation functions, comprised of appropriately weighted Fuzzy-Now recommendation functions and unmodified Fuzzy-Now recommendations (being unmodified because weighting factors did not need to be applied). The event with the highest instantaneous recommendation value at the requested query time in its final recommendation function is selected as the recommended event in step 1250 and the method ends in step 1260.

Thus, the inventive system and method accounts for the impact of the personal schedule of the user on the user's personal preferences. By tracking incidents over time, the system and method can determine when events need to be treated differently based on a recent incident. Recurring incidents, such as monthly cub scout meetings, dinner time, bed time on different days of the week, wake up time on different days of the week, etc., may be matched with altered user preferences caused by such recurring incidents. As discussed in reference to FIGS. 11A and 11B, a recurring but intermittent incident, such as coming home late or going to sleep early, may vary the recommendation function for one or more events depending on when the receiver/tuner was turned on or off. Similarly, a recurring or intermittent action concerning different TV sets in a multiple TV set household may vary the recommendation function for one or more events depending on which receiver/tuner was turned on or off. As stated earlier, although a TV set is used in the above examples as the media output device, any media presentation device, such as a radio, a PC browsing on the Internet, or a CD player, may be used in accordance with the present invention. Furthermore, when generating a schedule, the channels being considered may be on different media presentation devices. For instance, radio shows, TV shows, and Internet webcasts might be considered when generating recommendations.

This system and method effectively incorporates the personal schedule into the recommendation procedure. The invention is not limited by the embodiments described above which are presented as examples only but can be modified in various ways within the scope of protection defined by the appended patent claims.

While there have shown and described and pointed out fundamental novel features of the invention as applied to a preferred embodiments thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A system for recommending at least one media presentation event to a user, comprising:
   a recommendation system for generating a recommendation value for each of a plurality of media presentation events, wherein each event is being presented at a particular time on a particular channel;
   a Fuzzy-Now function recommendation system for receiving the generated recommendation values, for determining appropriate Fuzzy-Now functions to apply to each recommendation value, and for calculating a recommendation function for each event by applying the appropriate Fuzzy-Now functions to the generated recommendation value for said each event;
   a personal schedule modification system for receiving the Fuzzy-Now recommendation functions, for determining based on a personal schedule of a user if at least one appropriate weighting factor needs to be applied to at least one received Fuzzy-Now recommendation function, for applying the at least one appropriate weighting factor to the at least one received Fuzzy-Now recommendation function if it is determined that the at least one appropriate weighting factor needs to be applied to the at least one received Fuzzy-Now recommendation function, for outputting appropriately weighted Fuzzy-Now recommendation functions as final recommendation functions, and for outputting unweighted Fuzzy-Now recommendation function as final recommendation functions, the unweighted Fuzzy-Now recommendation functions having been determined not to need an appropriate weighting factor applied thereto; and
   a selector for selecting at least one event as a recommended event based on an instantaneous recommendation value of the recommended event at the request time, said instantaneous recommendation value being of a final recommendation function of the recommended event;
   wherein at least one of the recommendation system, the Fuzzy-Now recommendation system, and the personal schedule modification system comprises at least one processor.

2. The system as recited in claim 1, further comprising:
   a personal schedule module for receiving schedule input, wherein schedule input is at least one of direct input from the user and monitoring data, for storing and processing the received schedule input, and for maintaining the personal schedule based on the stored and processed schedule input.

3. The system as recited in claim 2, wherein said personal schedule module, when the schedule input is direct input from the user, comprises:
   a means for storing the direct input from the user, said direct input comprising a correlation between a user scheduling preference and one of at least one class of events and at least one event;
   a means for setting an appropriate weighting factor for a recommendation function of the correlated one of at least one class of events and at least one event, wherein the appropriate weighting factor being based upon the user scheduling preference; and
   a means for supplying the personal schedule modification system with the appropriate weighting factor when said correlation is recognized.

4. The system as recited in claim 3, wherein the at least one class of events is grouped by at least one of media programming type, genre, starting time of event, ending time of event, and time length of event.

5. The system as recited in claim 3, wherein the personal schedule modification system comprises:
   a means for recognizing circumstances fitting the user scheduling preference, said recognizing being performed in order to determine if the set appropriate weighting factor needs to be applied to the recommendation function of the correlated one of at least one class of events and at least one event.

6. The system as recited in claim 3, wherein the user scheduling preference is turning off a media output device at bedtime; the correlated one of at least one class of events and at least one event is a class of events which overlap in time with the bedtime; and the appropriate weighting factor for recommendation functions of the correlated class of events is set so as to decrease the recommendation functions of the correlated class of events.

7. The system as recited in claim 2, wherein said personal schedule module, when the schedule input is monitoring data, comprises:
   a means for recording monitored user actions;
   a means for detecting a correlation between recorded user actions and one of at least one class of events and at least one event;
   a means for setting a appropriate weighting factor for a recommendation function of the correlated one of at least one class of events and at least one event, wherein the appropriate weighting factor being based upon the detected correlation;
   a means for recording the detected correlation in order to recognize said detected correlation; and
   a means for supplying the personal schedule modification system with the appropriate weighting factor when said detected correlation is recognized.

8. The system as recited in claim 7, wherein the at least one class of events is grouped by at least one of media programming type, genre, starting time of event, ending time of event, and time length of event.

9. The system as recited in claim 7, wherein the personal schedule modification system comprises:
   a means for recognizing a recently monitored user action as fitting the recorded detected correlation, said recognizing being performed in order to determine if the set appropriate weighting factor needs to be applied to the recommendation function of the correlated one of at least one class of events and at least one event.

10. The system as recited in claim 7, wherein a detected correlation between the recorded user actions of turning off a media output device at a similar time each night and a class of events which overlap in time with the similar time results in an appropriate weighting factor for recommendation functions of the correlated class of events being set so as to decrease the recommendation functions of the correlated class of events.

11. The system as recited in claim 1, wherein the at least one appropriate weighting factor is applied by multiplying the at least one appropriate weighting factor by the at least one received Fuzzy-Now recommendation function.

12. The system as recited in claim 1, wherein the recommendation system is a three way media recommendation system comprising:

a feedback module for receiving direct event feedback from the user, for storing and processing the received direct event feedback, and for generating a feedback module recommendation based on the stored and processed direct event feedback, wherein the direct event feedback comprises user-entered ranking of an event;

an implicit module for receiving background monitoring data, for storing and processing the received background monitoring data, and for generating an implicit module recommendation based on the stored and processed background monitoring data, wherein the background monitoring data comprises data concerning which events are presented to the user and when events are presented to the user;

an explicit rule module for receiving explicit rules from the user, for storing and processing the received explicit rules, and for generating an explicit rule module recommendation based on the stored and processed explicit rules, wherein an explicit rule comprises a user-entered media programming preference; and a combiner for receiving the feedback module recommendation, the implicit module recommendation, and the explicit rule module recommendation, for combining the received recommendations in order to generate a recommendation value.

13. The system as recited in claim 1, wherein the Fuzzy-Now function recommendation system comprises:

a Fuzzy-Now function profile module for receiving Fuzzy-Now function profile input, wherein Fuzzy-Now function profile input is at least one of direct event feedback from the user, background monitoring data, and explicit rules from the user, for storing and processing the received Fuzzy-Now function profile input, and for generating a Fuzzy-Now function for said each event based on the stored and processed Fuzzy-Now function profile input.

14. The system as recited in claim 1, further comprising:

a scheduling information source for providing a plurality of event schedules to the media recommendation system, each of said event schedules being at least one event presented on a channel over a time period;

at least one media source for supplying said each event;

a media output device for receiving at least one event and presenting said at least one event to a user;

a receiver/tuner for tuning in a channel, for receiving at least one event over the tuned channel from the at least one media source, and for providing the received at least one event to the media output means;

a controller for directing the receiver/tuner, for directing the reception of the plurality of event schedules from the scheduling information source, and for directing the creation of an Electronic Programming Guide (EPG) Graphical User Interface (GUI) which will be provided to an EPG GUI output means, said EPG GUI being created from the plurality of event schedules; and an EPG GUI output device for receiving and presenting the event selected by the selector to the user.

15. The system as recited in claim 14, wherein the at least one media source is at least one of CATV system, an RF broadcast television system, the Internet, and a storage/playback device.

16. The system as recited in claim 14, wherein the receiver/tuner is at least one of a AM/FM radio receiver, a digital radio receiver, a television UHF/VHF receiver, a digital television receiver, a set-top box (STB), and a web browser.

17. The system as recited in claim 14, wherein the media output device is one of a television monitor, a speaker system, a holographic display, a screen on a PDA, and a screen on a mobile terminal.

18. A method for recommending at least one media presentation event to a user, comprising the steps of:

generating a recommendation value for each of a plurality of media presentation events, wherein each event is being presented at a particular time on a particular channel;

determining appropriate Fuzzy-Now functions to apply to each recommendation value;

calculating a recommendation function for each event by applying the appropriate Fuzzy-Now functions to the generated recommendation value for said each event;

determining based on a personal schedule of a user if at least one appropriate weighting factor needs to be applied to at least one Fuzzy-Now recommendation function;

applying the at least one appropriate weighting factor to the at least one Fuzzy-Now recommendation function if it is determined that the at least one appropriate weighting factor needs to be applied to the at least one Fuzzy-Now recommendation function;

outputting appropriately weighted Fuzzy-Now recommendation functions as final recommendation functions;

outputting unweighted Fuzzy-Now recommendation functions as final recommendation functions, the unweighted Fuzzy-Now recommendation functions having been determined not to need an appropriate weighting factor applied; and selecting at least one event as a recommended event based on an instantaneous recommendation value of the recommended event at the request time, said instantaneous recommendation value being of a final recommendation function of the recommended event;

wherein each step is performed by at least one processor.

19. The method as recited in claim 18, further comprising the steps of:

receiving schedule input, wherein schedule input is at least one of direct input from the user and monitoring data;

storing and processing the received schedule input; and maintaining the personal schedule based on the stored and processed schedule input.

20. The method as recited in claim 19, wherein said step of storing and processing the received schedule input comprises the steps of:

storing the direct input from the user, said direct input comprising a correlation between a user scheduling preference and one of at least one class of events and at least one event; and setting an appropriate weighting factor for a recommendation function of the correlated one of at least one class of events and at least one event, wherein the appropriate weighting factor being based upon the user scheduling preference.

21. The method as recited in claim 20, wherein the at least one class of events is grouped by at least one of media programming type, genre, starting time of event, ending time of event, and time length of event.

22. The method as recited in claim 20, wherein the determining based on a personal schedule if at least one appropriate weighting factor needs to be applied to at least one Fuzzy-Now recommendation function comprises the step of:

recognizing circumstances fitting the user scheduling preference, said recognizing being performed in order to determine if the set appropriate weighting factor needs to be applied to the recommendation function of the correlated one of at least one class of events and at least one event.

23. The method as recited in claim 20, wherein the user scheduling preference is turning off a media output device for presenting the media event at bedtime; the correlated one of at least one class of events and at least one event is a class of events which overlap in time with the bedtime; and the appropriate weighting factor for recommendation functions of the correlated class of events is set so as to decrease the recommendation functions of the correlated class of events.

24. The method as recited in claim 19, wherein the schedule input is monitored user actions, said step of storing and processing the received schedule input comprises the steps of:
   recording the monitored user actions;
   detecting a correlation between recorded user actions and one of at least one class of events and at least one event;
   setting a appropriate weighting factor for a recommendation function of the correlated one of at least one class of events and at least one event, wherein the appropriate weighting factor being based upon the detected correlation; and
   storing the detected correlation in order to recognize said detected correlation.

25. The method as recited in claim 24, wherein the at least one class of events is grouped by at least one of media programming type, genre, starting time of event, ending time of event, and time length of event.

26. The method as recited in claim 24, wherein the determining based on a personal schedule if at least one appropriate weighting factor needs to be applied to at least one Fuzzy-Now recommendation function comprises the step of:
   recognizing a recently monitored user action as fitting the recorded detected correlation, said recognizing being performed in order to determine if the set appropriate weighting factor needs to be applied to the recommendation function of the correlated one of at least one class of events and at least one event.

27. The method as recited in claim 24, wherein a detected correlation between the recorded user actions of turning off a media output device for presenting the media event at a similar time each night and a class of events which overlap in time with the similar time results in an appropriate weighting factor for recommendation functions of the correlated class of events being set so as to decrease the recommendation functions of the correlated class of events.

28. The system as recited in claim 18, wherein the step of applying the at least one appropriate weighting factor to the at least one Fuzzy-Now recommendation function comprises the step of:
   multiplying the at least one appropriate weighting factor by the at least one received Fuzzy-Now recommendation function.

29. The method as recited in claim 18, wherein the step of generating a recommendation value comprises the steps of:
   receiving and storing direct event feedback from the user, wherein the direct event feedback comprises user-entered ranking of an event;
   processing the received and stored direct event feedback in order to generate a feedback profile recommendation based on the stored and processed direct event feedback;
   receiving and storing background monitoring data, wherein the background monitoring data comprises data concerning which events are presented to the user and when events are presented to the user;
   processing the received and stored background monitoring data in order to generate an implicit profile recommendation;
   receiving and storing explicit rules from the user, wherein an explicit rule comprises a user media programming preference;
   processing the received and stored explicit rules in order to generate an explicit rule profile recommendation; and
   combining the feedback profile recommendation, the implicit profile recommendation, and the explicit rule profile recommendation in order to generate the recommendation value.

* * * * *